United States Patent [19]

Smith

[11] 4,170,220
[45] Oct. 9, 1979

[54] SOLAR HEAT COLLECTOR

[76] Inventor: Henry C. Smith, P.O. Box 307, Johns Island, S.C. 29455

[21] Appl. No.: 912,096

[22] Filed: Jun. 2, 1978

Related U.S. Application Data

[63] Continuation of Ser. No. 736,820, Oct. 29, 1976, abandoned.

[51] Int. Cl.² .............................................. F24J 3/02
[52] U.S. Cl. ................................... 126/428; 126/450
[58] Field of Search ............... 126/270, 271; 237/1 A; 165/170

[56] References Cited

U.S. PATENT DOCUMENTS

| | | | |
|---|---|---|---|
| 3,327,776 | 6/1967 | Butt | 165/170 |
| 3,799,145 | 3/1974 | Butterfield | 126/271 |
| 3,902,474 | 9/1975 | Pyle | 126/270 |
| 3,995,615 | 12/1976 | Hojnowski | 126/271 |
| 4,038,969 | 8/1977 | Smith | 126/271 |

Primary Examiner—Kenneth W. Sprague
Attorney, Agent, or Firm—Bailey, Dority & Flint

[57] ABSTRACT

A solar heat collector is illustrated wherein a flat box has an inlet port and an outlet port connected by a tortuous flow path defined by upright baffle means, said tortuous flow path including a plurality of individual side-by-side interconnected passageways.

1 Claim, 3 Drawing Figures

SOLAR HEAT COLLECTOR

This is a continuation of application Ser. No. 736,820, filed Oct. 29, 1976, now abandoned.

BACKGROUND OF THE INVENTION

Solar heat collectors have been provided employing tortuous flow paths such as illustrated in U.S. Pat. Nos. 3,894,685 and 3,902,474. In each instance the tortuous flow path consists of a single passageway defined by upright baffles which serve to increase the area contacted and to which heat is imparted by the sun's rays. Due to the varying angles of incidence of the sun's rays, which vary from the North/South to East/West directions, since the baffles all are oriented in one or the other directions, there comes a time when the baffles are relatively ineffective to receive heat from the sun's rays. Moreover, the single flow path which consists of a single passageway is limited in surface area to receive heat from the sun's rays.

Accordingly, it is an important object of this invention to provide a solar heat collector including upright baffles in both the North/South and East/West directions defining a tortuous path consisting of a plurality of passageways.

Another important object of the invention is the provision of increased baffle surface area for receiving heat from the sun by dividing the serpentine path into a plurality of individual passageways. To thus employ a plurality of passageways within the tortuous path, a large volume of air may be transported in contact with a large surface area. Since the changes of direction preferably occur at right angles, smooth flow paths are broken up causing turbulance which is effective in breaking down the laminar areas closely adjacent the baffles thus effectively "scouring" the heat therefrom which has been imparted thereto by the sun's rays. While right angles are illustrated, any abrupt change of direction may be suitable, even sharply arcuate turns.

BRIEF DESCRIPTION OF THE INVENTION

It has been found that a solar heat collector may be constructed wherein a serpentine path formed by upright baffles may be subdivided into a plurality of continuous passageways into increasing the surface area for reception of the sun's rays while minimizing changes in air flow direction. In this fashion baffle surface area may be disposed in both the North/South and East/West directions, or intermediate directions, to minimize the variations in the angle of incidence of the sun's rays as the angle of incidence vary from time to time during the day and throughout the year.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
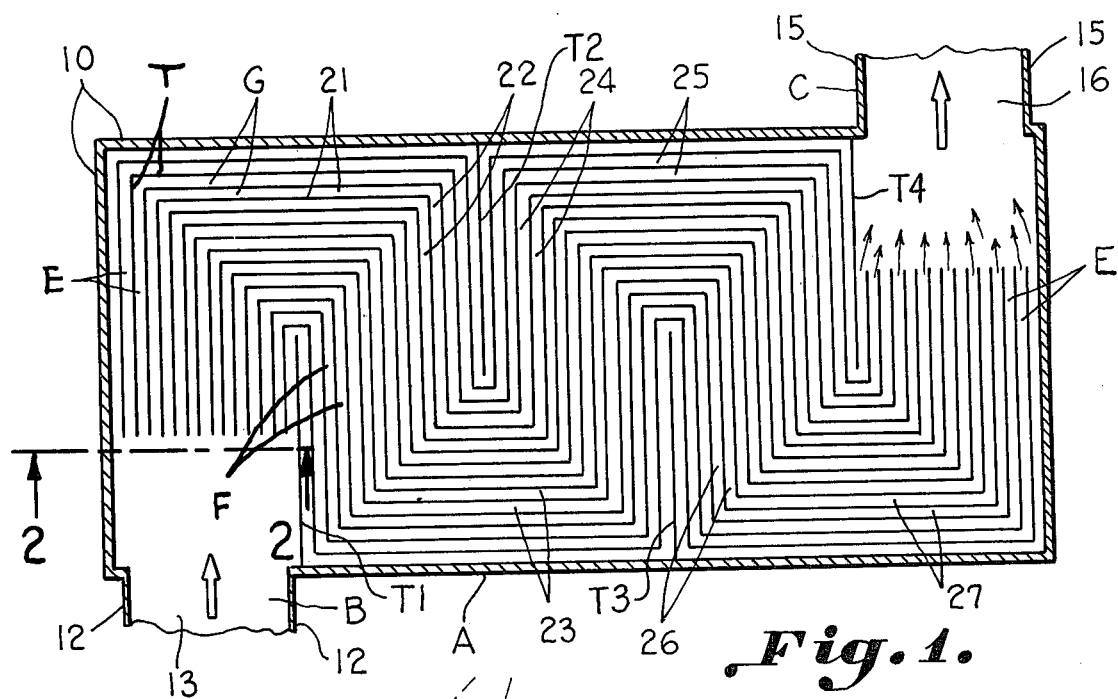
FIG. 1 is a schematic plan view illustrating a solar heat collector constructed in accordance with the present invention with parts in section.

A solar heat collector having a box A is illustrated. A plurality of baffles are disposed in the box between a fluid inlet port B in the box and a fluid outlet port C in the box. Panel means D at least partially cover the box exposing the interior of the box including the baffles to the sun's rays. A plurality of baffles are carried in side-by-side upright relation within the box to form a plurality of side-by-side passageways E each connected to the inlet port for transporting fluid in a first direction therefrom. A plurality of baffles are carried in side-by-side upright relation within the box to form a plurality of side-by-side passageways F each connected to the outlet port for transporting fluid in a second direction thereto. Means G transport fluid from the first plurality of side-by-side passagwways to the second plurality of side-by-side passageways.

Referring more particularly to the drawing, the box A includes sides 10 and a bottom 11. The inner portion of the sides and bottom, as well as the baffles, are preferably black so as to facilitate reception of the sun's rays and this might best be accomplished by the use of low gloss black paint covering a material of high heat conductivity, such as aluminum. Preferably, the baffles described herein are of aluminum, but it has been found that all the components, including the baffles may be constructed of acrylic plastic having a thickness on the order of one-eighth of an inch. This presents a somewhat thicker surface than the metallic baffles which are preferably on the order of 0.025". While the plastic baffles do not possess high heat conductivity, they have been found to be effective in that heat collectors employing plastic baffles compare favorably with those employing metallic baffles. For example, a box measuring 33"×75"×7" has approximately 280 square feet of surface area, the baffles being disposed on one inch centers. Such boxes are capable of supplying 3 BTU's per square foot of box per minute. It is also thought that the spacing between baffles comprising respective passageways may vary up to two inch centers without substantial loss of efficiency. This is because the heat is largely received by the upper portion of the baffles since the sun seldom reaches the valleys, the sun being directly overhead for only a short period of time.

Figure 3:
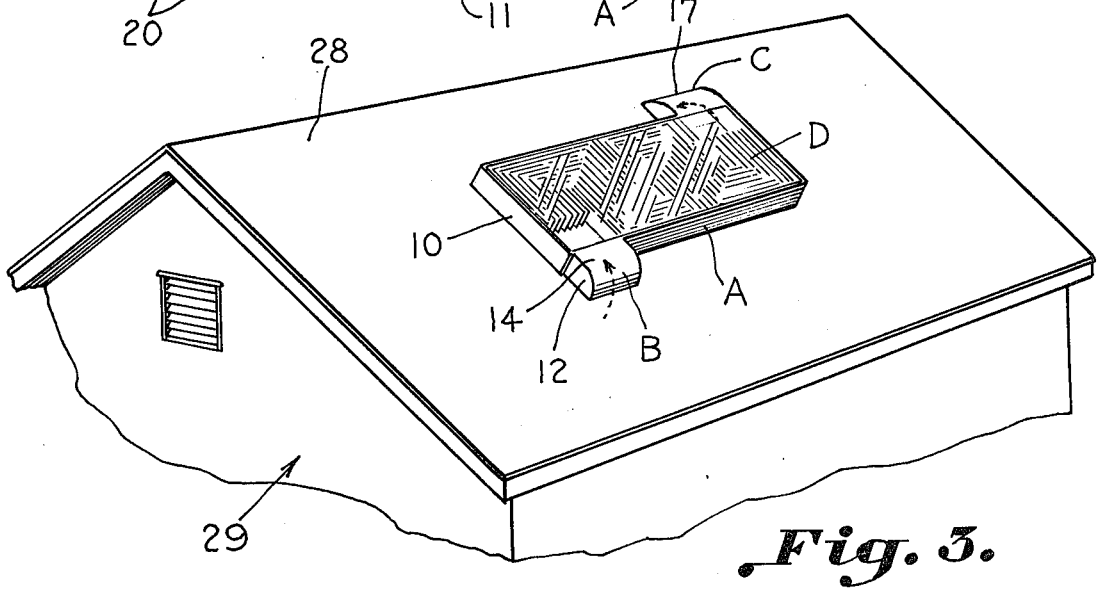
FIG. 3 is a perspective view illustrating a solar heat collector constructed in accordance with the present invention positioned for use upon the roof of a building structure.

Fluid, in this instance air, is illustrated in FIGS. 1 and 3 as entering an inlet port B in the box A. The inlet port B is defined by a duct having sides 12, a bottom 13 and a top 14. A fluid outlet port C in the boxes is illustrated as including a duct having sides 15, a bottom 16 and a top 17.

A suitable panel means, preferably glass, or some other suitable transmitting means, at least partially covers the box and exposes the interior thereof, including the baffles to the sun's rays. It will be observed in FIG. 2, that a space 18 is provided between the glass panel means D and the edge of the respective baffles. A groove 19 is provided in the upper interior portion of the sides 10 to accommodate the panel means D. The baffles T may be secured as by a suitable adhesive at their lower edges to the base 11, or if plastic baffles are utilized, they may be secured thereto as by a solvent weld. The space 18 which may be on the order of ⅛"

provides cross-air flow which is helpful in conveying the heat collected adjacent the top of the baffles. If desired, the baffles may be flush with the panel as this feature is not believed essential. It will be noted that border baffles which define direction changes in the tortuous path, such as illustrated at T1, T2, T3 and T4, may be preferably flush with the cover panel to avoid cross migration of air from the tortuous path.

It will be observed that the baffles define a tortuous path which comprises a plurality of side-by-side passageways E defined by the baffles which are carried in upright side-by-side relation. Each of the passageways E is connected to the inlet port for transporting air in the same direction therefrom. A plurality of side-by-side passageways F form a part of the tortuous passageways and have connection with the outlet port, as well as the inlet port. The means G in the form of a path at right angles to the alternating paths, defined by the passageways E and F, transport fluid from the first mentioned passageways to the second mentioned passageways. By further reference to the drawing, it will be noted that the passageways 21 which define the first change of direction in the torturous path leading from the inlet, deliver air into continuous passageways of uniform cross-section wherein the passageways 22 define a second change of direction, a third being illustrated at 23 with subsequent changes of direction illustrated at 24, 25, 26 and 27 prior to the final change of direction into the outlet port C.

Figure 2:
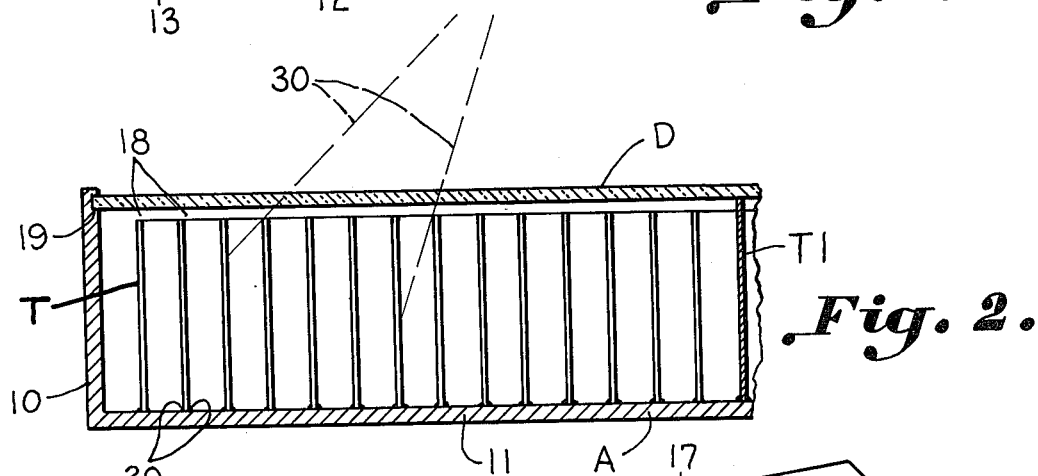
FIG. 2 is an enlarged longitudinal sectional elevation taken on the line 2—2 in FIG. 1.

A roof 28 of a suitable dwelling or other structure, broadly designated at 29, is illustrated in FIG. 3 wherein air is received and delivered through respective inlet and outlet ports. Varying angles of incidences of the sun's rays are illustrated in FIG. 2 at 30. The box comprising the solar heat collector may be employed in a side-by-side series of a plurality of boxes or a large single box may even be employed. Any suitable storage means for heat in the form of stone heat collecting means may be employed and suitable heat and air conditioning equipment may be operated utilizing the heat collected by the solar collector illustrated.

While a preferred embodiment of the invention has been described using specific terms, such description is for illustrative purposes only, and it is to be understood that changes and variations may be made without departing from the spirit or scope of the following claims.

What is claimed is:

1. For use in a solar heat collector having a box, a plurality of baffles in said box, a fluid inlet port in said box, and fluid outlet port in said box, and transparent panel means at least partially covering said box exposing the interior of said box including said baffles to the sun's rays, the improvement comprising:

a first plurality of said baffles carried in side-by-side upright relation within said box exposed to the sun's rays to form a first plurality of side-by-side generally horizontal passageways each connected to said inlet port for transporting fluid in a first horizontal direction therefrom;

a second plurality of said baffles carried in side-by-side upright relation within said box exposed to the sun's rays to form a second plurality of side-by-side generally horizontal passageways each connected to said outlet port for transporting fluid in a second horizontal direction thereto;

at least a third plurality of baffles carried in side-by-side relation forming third passageways interconnecting said first passageways with said second passageways, said third passageways providing horizontal flow to said first and second passageways;

a bottom included in said box exposed to the sun's rays passing through said transparent panel and between said baffles;

said first, second, and third plurality of baffles terminate within said panel means adjacent said transparent panel at a top edge of said baffles and adjacent said box bottom at a lower edge of said baffles in heat transfer relation therewith for reception of the sun's rays through the panel; and border baffle means extending in flush relation with said panel means between said first and second plurality of baffles preventing fluid communication between said first and second passageways except by said third passageways.

* * * * *